(12) United States Patent
Eanes, Jr.

(10) Patent No.: US 12,471,237 B2
(45) Date of Patent: Nov. 11, 2025

(54) SECURE COMPUTER RACK POWER SUPPLY TESTING

(71) Applicant: Microsoft Technology Licensing, LLC, Redmond, WA (US)

(72) Inventor: Thomas Rudolph Eanes, Jr., Bluemont, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 18/237,664

(22) Filed: Aug. 24, 2023

(65) Prior Publication Data

US 2025/0071929 A1 Feb. 27, 2025

(51) Int. Cl.
*H05K 7/14* (2006.01)
*G01R 31/40* (2020.01)

(52) U.S. Cl.
CPC .......... *H05K 7/1492* (2013.01); *G01R 31/40* (2013.01)

(58) Field of Classification Search
CPC .... G01R 19/0084; G01R 31/40; G01R 31/42; G06F 1/189; G06F 1/28; H05K 7/1492
USPC .......................................................... 361/78
See application file for complete search history.

(56) References Cited

U.S. PATENT DOCUMENTS 9,594,125 B1 * 3/2017 Waldron ................ G01R 31/42
2020/0064377 A1 * 2/2020 Karnes .................. G01R 29/18

FOREIGN PATENT DOCUMENTS

CN 112147535 A 12/2020

OTHER PUBLICATIONS

Raritan White Paper: High Power—Deploying High Power to IT Equipment Racks 2017 (Year: 2017).*
International Search Report and Written Opinion received for PCT Application No. PCT/US2024/038440, Nov. 5, 2024, 15 pages.

* cited by examiner

*Primary Examiner* — Kevin J Comber
(74) *Attorney, Agent, or Firm* — Rainier Patents, P.S.

(57) ABSTRACT

The description relates to safely and accurately testing high-power computer rack power supplies. One example can include a computer rack that includes multiple computers and a high-power computer rack supply (HPCRS) lead terminating in a connector. The HPCRS lead includes multiple conductors and is configured to couple to the computer rack to power the multiple computers. This example can include a full-spectrum computer rack power supply testing (FSCRPST) device configured to test the power from the HPCRS lead.

20 Claims, 10 Drawing Sheets

SECURE COMPUTER RACK POWER SUPPLY TESTING

BACKGROUND

Large amounts of computing resources tend to be physically located together in multiple adjacent computer racks. High power leads supply power to each computer rack. Traditionally, testing computer rack power supplies at each computer rack was a slow, laborious, and dangerous process.

SUMMARY

This patent relates to safely and accurately testing high-power computer rack power supplies. One example can include a computer rack that includes multiple computers and a high-power computer rack supply (HPCRS) lead terminating in a connector. The HPCRS lead includes multiple conductors and is configured to couple to the computer rack to supply power to the multiple computers.

This example can include a full-spectrum computer rack power supply testing (FSCRPST) device configured to test the power from the HPCRS lead. The FSCRPST device can include a corresponding connector configured to couple to the connector of the HPCRS lead. The multiple conductors of the HPCRS lead can include three power conductors, a neutral conductor, and a ground conductor. This example can also include a set of multiple alternating current (AC) voltmeters positioned on the display area. Individual AC voltmeters can be dedicated to an individual pair of conductors of the high-power computer rack supply lead and are configured to display a numeric test voltage relating to the individual pair of conductors simultaneously to other AC voltmeters of the set displaying numeric test voltages relating to other pairs of individual conductors.

This example can also include a single pole double throw switch positioned on the display area and electrically coupled at an output pole to the ground conductor through another individual voltmeter and electrically coupled to the power conductor at a first input pole and electrically coupled to the neutral conductor at a second input pole, the single pole double throw switch comprising a first closed position on the first input pole to display test voltages between the power conductor and the ground conductor on the individual voltmeter and configured to display test voltages between the neutral conductor and the ground conductor on the individual voltmeter in a second closed position.

This summary is intended to provide a quick introduction to some of the present concepts and is not intended to be limiting or all inclusive.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Figure 1A:
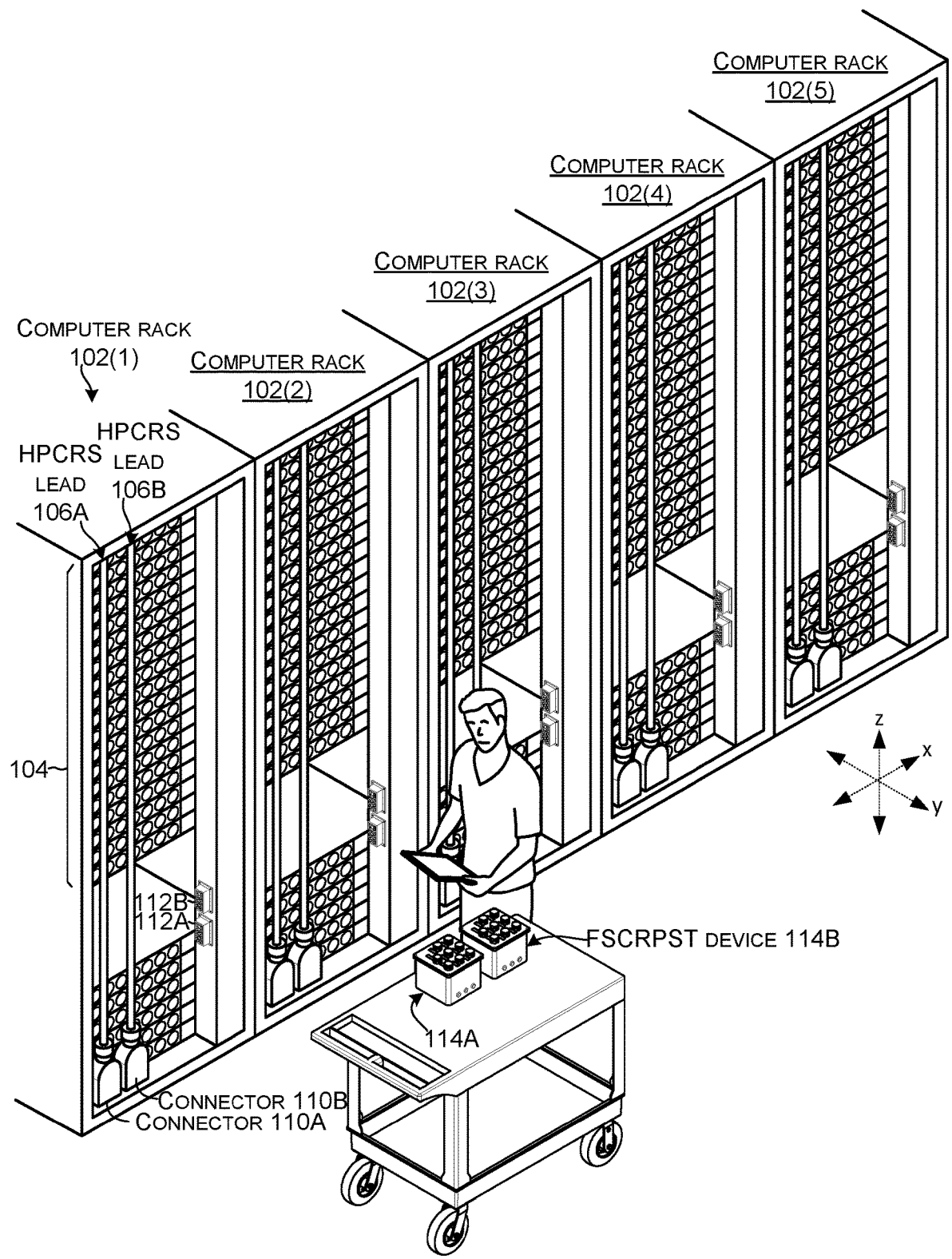
FIGS. 1A-3 and 6 show example high-power computer rack power supply testing systems in accordance with some implementations of the present concepts.

The present concepts relate to safe testing of computer racks containing computers, such as those found in data centers. Large numbers of computers tend to be physically located together in multiple adjacent computer racks. These computers require large amounts of power to operate. The power can be supplied via high-power computer rack supply leads or lines. The high-power computer rack supply leads deliver high power in the form of high voltages, such as 200 to 500 volts and high amperage to power dozens or hundreds of computers in the computer rack.

The high-power computer rack supply leads include multiple conductors that function to provide power, neutral, and ground to the computer rack. Traditionally, testing high-power computer rack supply leads at each computer rack was a slow, laborious, and dangerous process. In these traditional scenarios, a technician would hold the live high-power computer rack supply lead. The technician would insert probes from a meter into the high-power computer rack supply lead to contact pairs of conductors within the lead while trying to see the meter. The technician would try to maintain good contact between the conductors and the probes while remaining insulated from the power, all while trying to read the meter. The technician would determine if the meter reading conformed to design specifications and then move to another pair of conductors in a serial sequence. This process was repeated until all pairs of conductors of the high-power computer rack supply lead were checked and then the process was repeated on the next high-power computer rack supply lead. This was a slow, tedious, stressful, and dangerous process. The present concepts provide a technical solution to these and other problems.

The present concepts provide a technical solution in the form of a full-spectrum computer rack power supply testing device (or FSCRPST device). The full-spectrum computer rack power supply testing device includes a power connector that matches a power connector of the computer rack and is complementary to a power connector on the high-power computer rack supply leads (or HPCRS leads). The high-power computer rack supply lead can be de-energized (e.g., open circuit). The technician can plug the power connector of the high-power computer rack supply lead into the corresponding connector of the full-spectrum computer rack power supply testing device. The high-power computer rack supply lead can then be energized. The full-spectrum computer rack power supply testing device will simultaneously present all relevant voltage values (e.g., power values for conductor pairs under test). The presentation is accomplished without the technician touching the high-power computer rack supply lead or the full-spectrum computer rack power supply testing device.

The full-spectrum computer rack power supply testing device also includes a verification switch that the technician can activate to confirm proper functioning of the full-spectrum computer rack power supply testing device and the high-power computer rack supply lead. Once the testing is complete, the high-power computer rack supply lead can be de-energized before the technician touches it. The technician can remove the connector of the de-energized high-power computer rack supply lead from the full-spectrum computer rack power supply testing device and insert it into the corresponding connector of the computer rack. At this point, the high-power computer rack supply lead can be safely re-energized to power the computers in the computer rack with confidence that the high-power computer rack supply lead is conforming to design specifications.

Figure 1B:
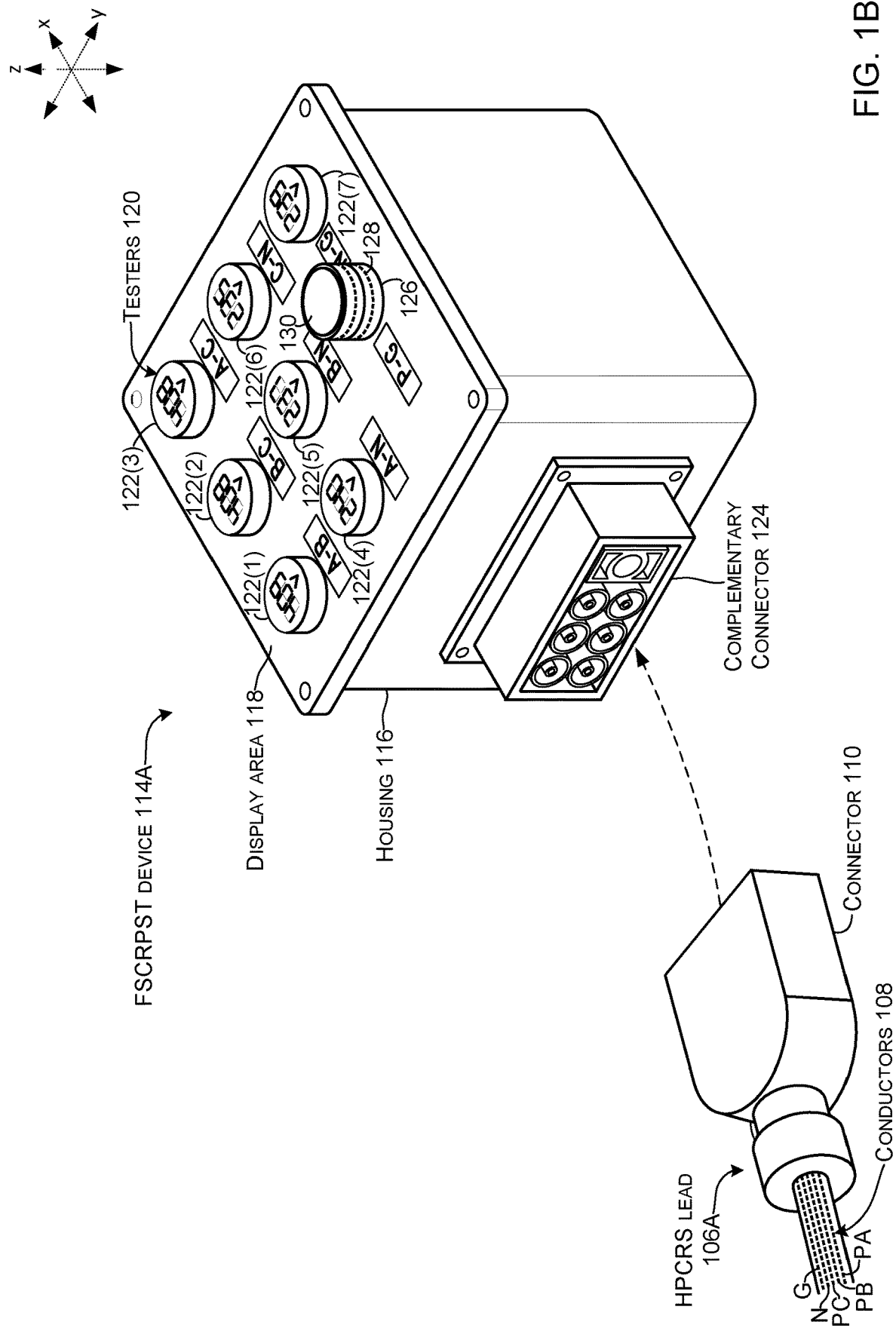

FIGS. 1A and 1B collectively show an example system 100. The system 100 includes computer racks 102. FIG. 1A shows five computer racks, but any number of computer racks can be employed. Each computer rack 102 includes multiple computers 104. The computer racks 102 receive power from HPCRS leads 106 and distribute the power to the computers 104. To avoid clutter on the drawing page of FIG. 1A, these elements are only labelled relative to computer rack 102(1) but are shown on all of the computer racks. The HPCRS leads 106 can extend to the computer racks 102 from a panel box or control panel (not shown), which can energize and de-energize the individual HPCRS leads 106 as desired.

The HPCRS leads 106 terminate in a coupler or connector 110. The computer rack 102 includes a corresponding or complementary coupler or connector 112. The connectors can be various styles, such as Harting connectors or national electrical manufacturers association (NEMA) connectors, among others. As shown in FIG. 1B, the HPCRS leads 106 include multiple conductors 108 including power P, neutral N, and ground G. This implementation includes three power conductors (PA, PB, and PC). The three power conductors allow the HPCRS leads 106 to deliver three phase power to the computer rack 102.

Figure 4:
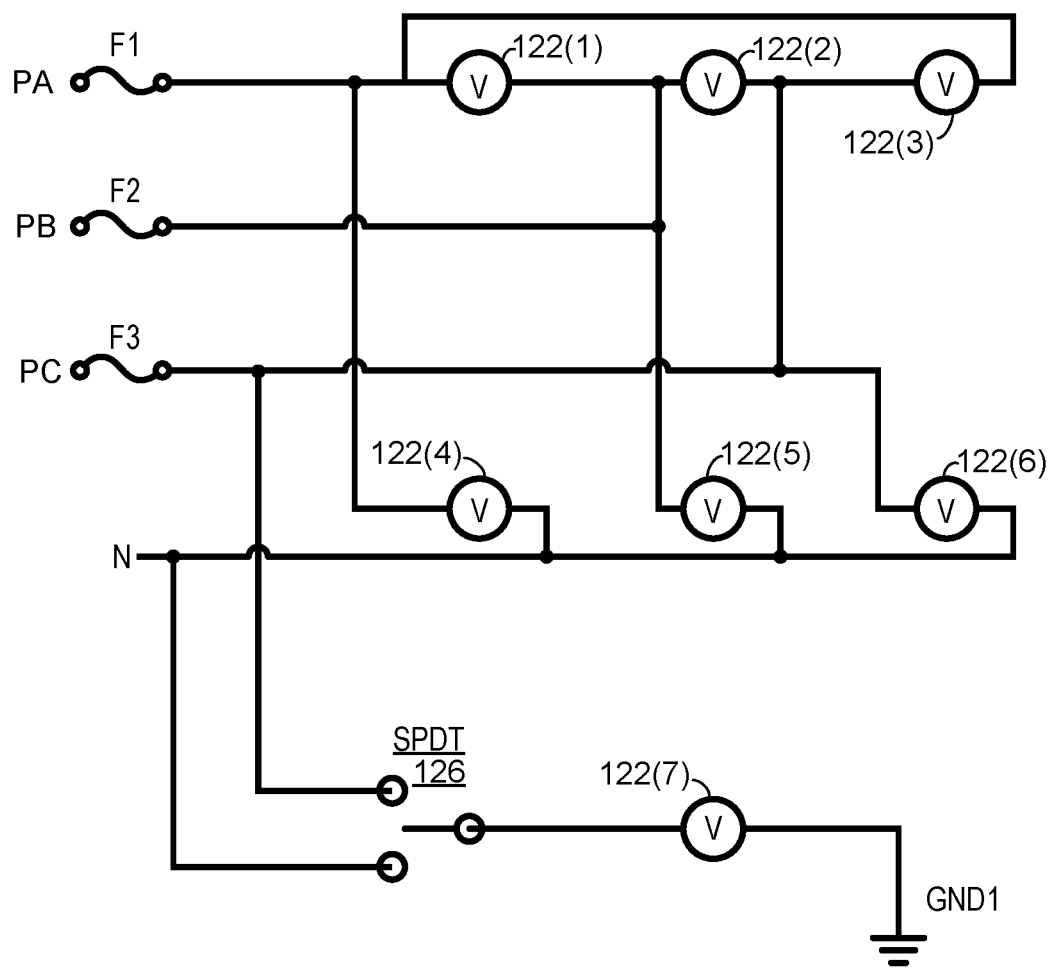
FIGS. 4 and 5 show schematic diagrams of example high-power computer rack power supply testing devices in accordance with some implementations of the present concepts.

System 100 further includes an example full-spectrum computer rack power supply testing (FSCRPST) device 114. The FSCRPST device 114 includes an electrically insulative housing 116. The housing 116 is electrically insulative to protect a user touching the FSCRPST device 114. The housing 116 defines a display area 118. In this case, the display area 118 is a planar surface. In other configurations, the display area can be curved (e.g., curvilinear) or have other configurations rather than planar. The FSCRPST device 114 can include testers 120 positioned on the display area 118. In this implementation, the testers 120 are manifest as voltmeters 122. Other testers 120 can include ammeters and/or ohmmeters, among others. The FSCRPST device 114 also includes a corresponding or complementary coupler or connector 124 that is identical to complementary connector 112 of the computer rack 102. The complementary connector 124 couples with connector 110. The coupling extends the conductors 108 into the FSCRPST device 114 where they are electrically coupled to the testers 120. This aspect is shown in FIG. 4.

As shown in FIG. 1B, the FSCRPST device 114 includes seven voltmeters 122(1)-122(7). The voltmeters 122 are positioned on the display area 118. The voltmeters include a numeric display. The numeric display is visible on the display area 118. Voltmeters 122(1)-122(6) are dedicated to individual pairs of conductors including power A to power B (A-B), power B to power C (B-C), power A to power C (A-C), power A to neutral (A-N), power B to neutral (B-N), and power C to neutral (C-N). Voltmeter 122(7) is coupled to two pairs of conductors via a switch 126. In this case, the two pairs of conductors are power to ground (P-G) and neutral to ground (N-G). In this implementation, the switch 126 is biased to close the power to ground (P-G) circuit which is displayed on the voltmeter 122(7). The bias can be temporarily overcome on switch 126 to cause the voltage for neutral to ground (N-G) to be displayed on voltmeter 122(7). In this implementation, the switch 126 includes a spring 128 that biases a contact surface 130 upward (in the +z reference direction) to close the power to ground circuit for testing. The user can temporarily overcome this bias by pushing downwardly (in the −z reference direction) to open the power to ground circuit and close the neutral to ground circuit for testing.

The seven voltmeters 122(1)-122(7) simultaneously display numeric values for each of the desired conductor pairs (e.g., power to power, power to neutral, and power to ground). The user can then activate the switch 126 to check the FSCRPST device 114 operation by testing neutral to ground. Note that power to ground and neutral to ground cannot be tested simultaneously because the voltage from the power conductor would affect the neutral to ground reading. This implementation provides a technical solution that lets the user switch between the two circuits.

Figure 2A:
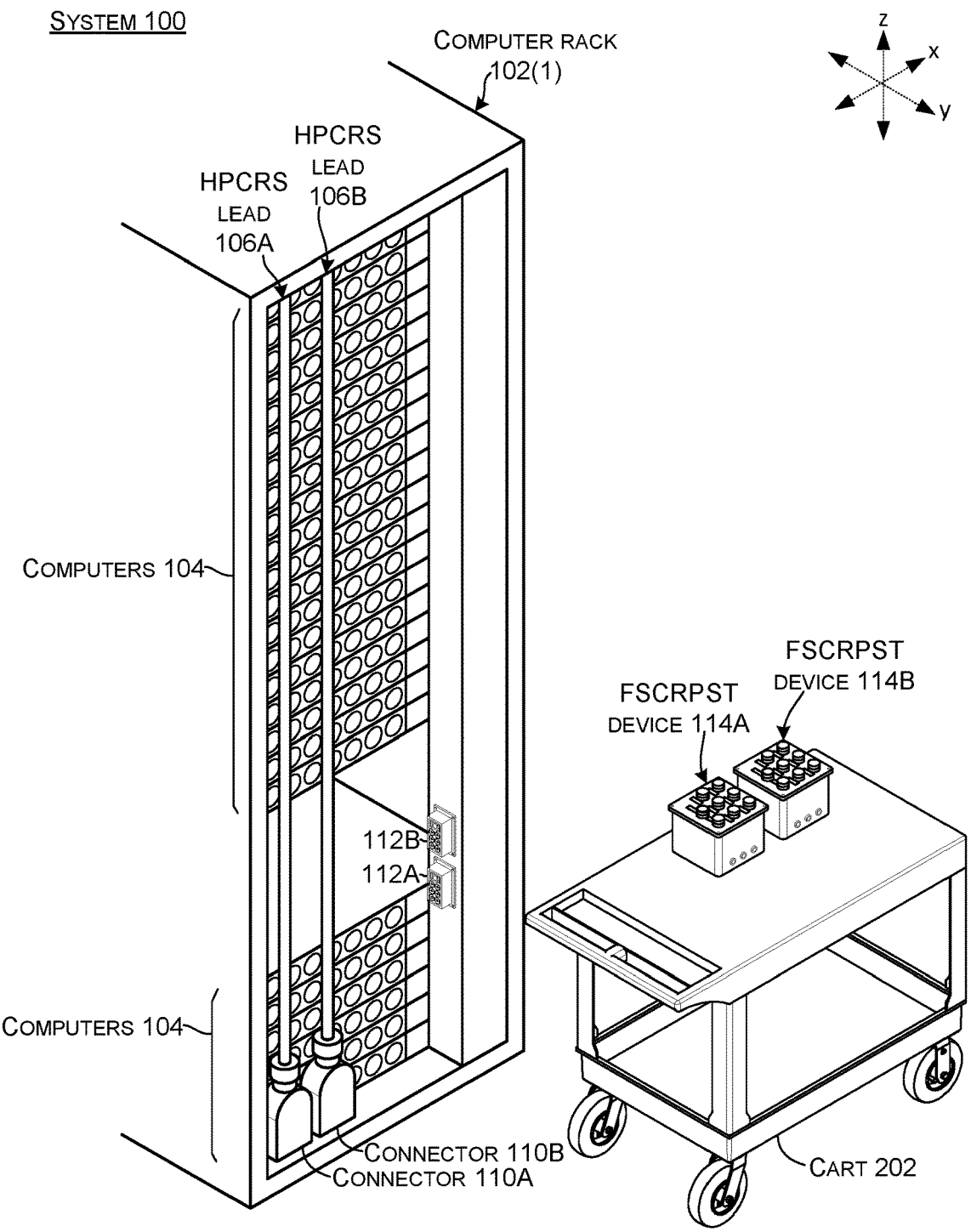
Figure 2B:
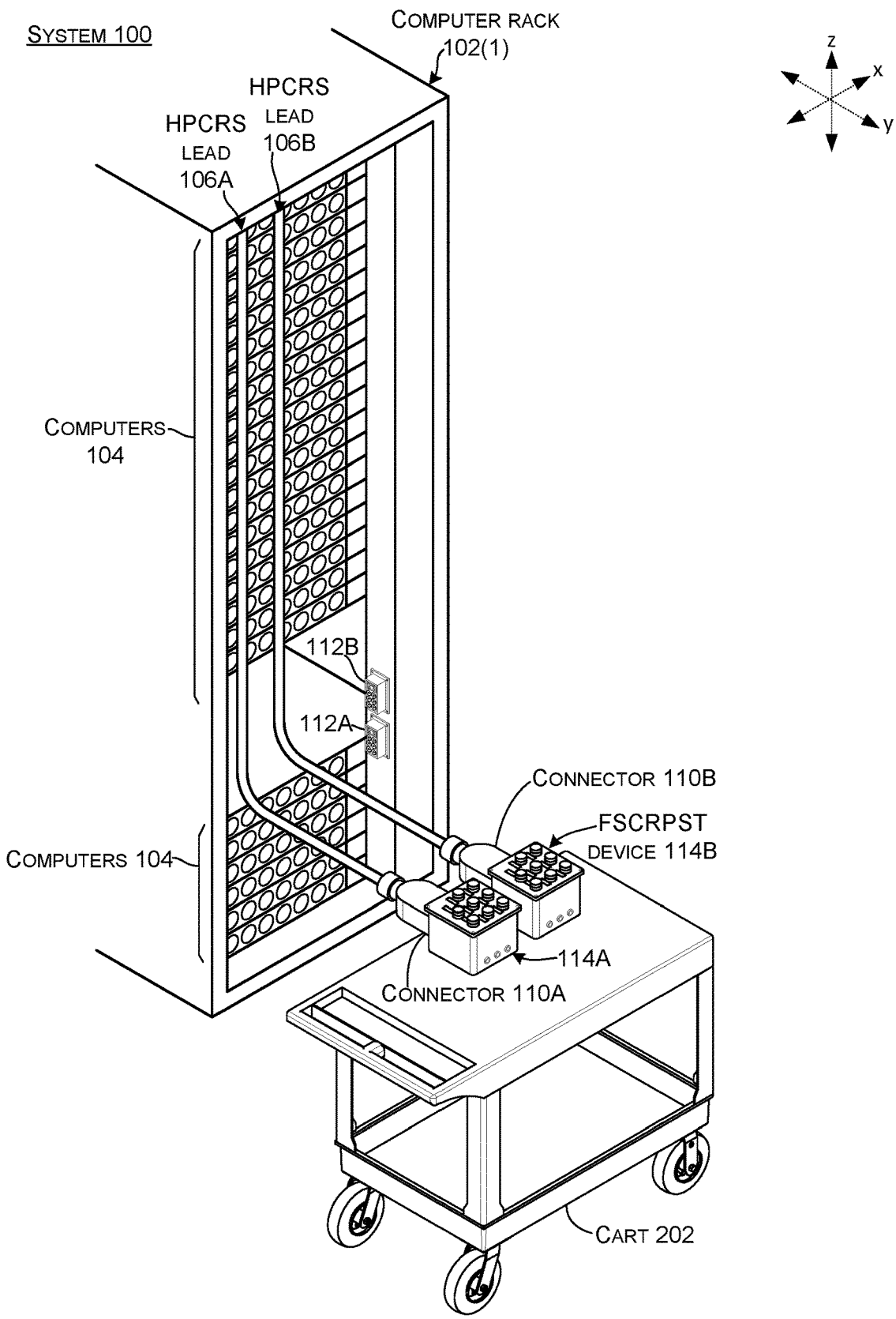
Figure 2C:
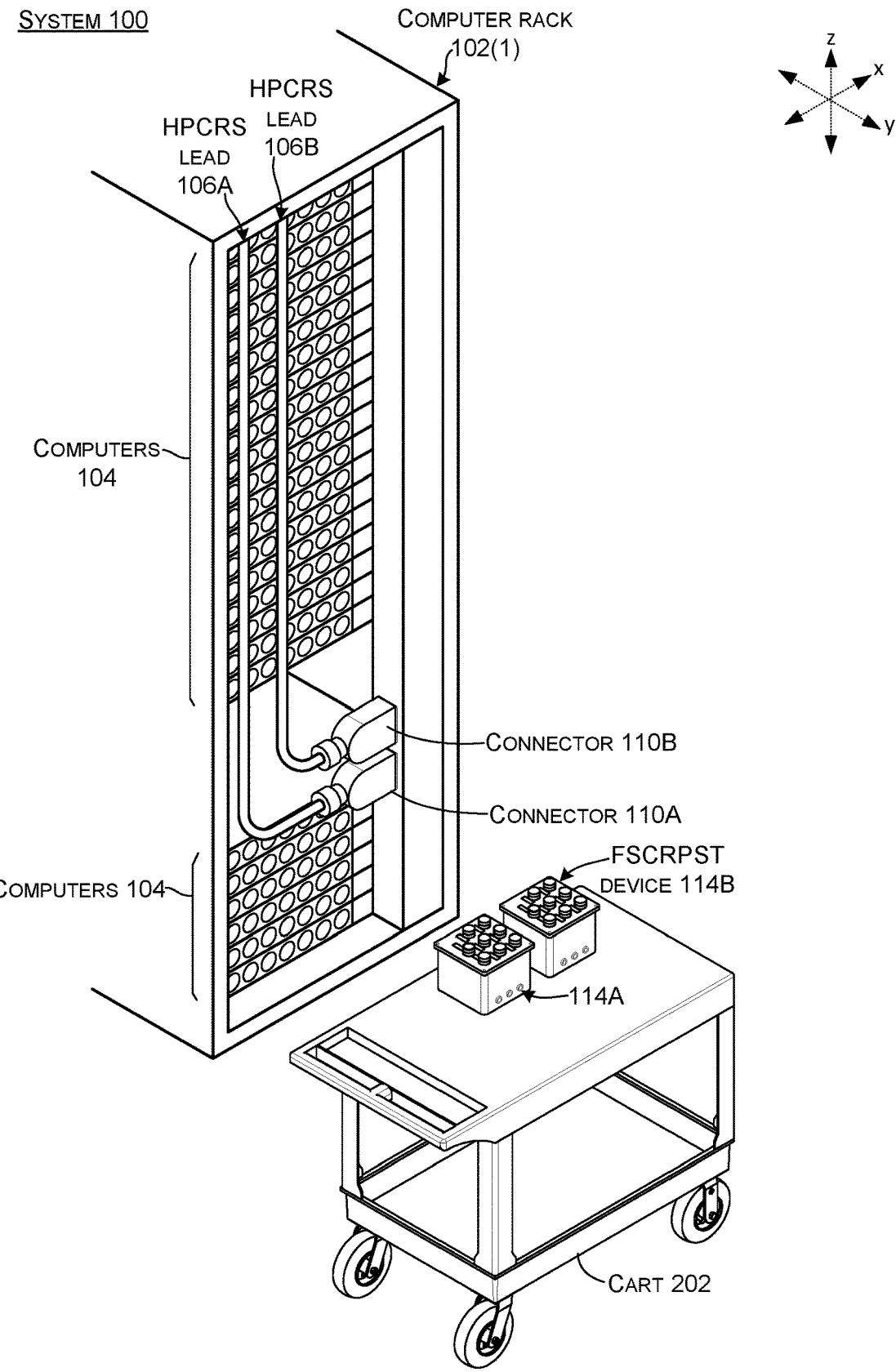

FIGS. 2A-2C show a use case scenario for system 100. The elements shown in FIGS. 2A-2C are introduced above relative to FIGS. 1A and 1B and are not re-introduced here for sake of brevity. FIG. 2A begins the installation or maintenance use case scenario. As introduced above relative to FIG. 1A, this implementation includes two HPCRS leads 106A and 106B per computer rack 102. As such, two FSCRPST devices 114A and 114B are employed to facilitate and speed the installation process. Other implementations could employ one or more than two HPCRS leads 106 per computer rack 102 and can match the number of FSCRPST devices 114 accordingly. In this case, the two FSCRPST devices 114A and 114B are positioned on a service cart 202. In other cases, the FSCRPST devices 114 could include a stand, a clamp, and/or be handheld.

As shown in FIG. 2A, at this point the HPCRS leads 106A and 106B are not (or do not need to be energized). The technician can safely handle the non-energized HPCRS leads 106 and can couple connector 110A with connector 124A of FSCRPST device 114A and can couple connector 110A with connector 124B of FSCRPST device 114B. Note connectors 124A and 124B are facing away from the reader in these views and as such are not visible, but are shown FIG. 1B.

As shown in FIG. 2B, once coupled, the technician can stop handling (e.g., touching) the HPCRS leads 106 and can cause them to be energized. For instance, the technician can go to the control panel and manually flip a breaker to energize the HPCRS leads 106. Alternatively, the technician can be in communication with someone at the control panel and have them energize the HPCRS leads 106.

With the HPCRS leads 106 energized, the technician can simultaneously review the test voltages on the FSCRPST devices 114 for the pairs of conductors as described above relative to FIG. 1B. The technician can review the voltages without touching the HPCRS leads 106. In some configurations, the FSCRPST devices 114 can record the voltages. The voltages can be stored on board or communicated for external storage. Further, some implementations can include indications that the voltages conform to (e.g., are within a predefined range) design specifications. For instance, if an individual voltage is conforming, the background of the voltmeter could glow a green color. If the individual voltage is not conforming the background could glow a red color. Other indications are contemplated, such as other colors, flashing displays, and/or audio alarms for non-conforming voltages. This configuration provides numeric values for each test voltage simultaneously combined with a qualitative go-no-go confirmation signal. The FSCRPST devices 114 can include an interface (not shown) that allows the user/technician to set the voltage ranges of the design specifications. Alternatively or additionally, the FSCRPST devices 114 may interact with a remote application, such as on the technician's phone or tablet that allows the technician to set the voltage ranges. In other cases, the voltage range values may be preset on the FSCRPST devices 114 in a manner that may or may not allow user adjustment.

As one example of predefined ranges, the predefined ranges for power A to power B, power B to power C, and power A to power C could be 400 volts to 420 volts. FIG. 1B shows voltages of 409, 408, and 408, respectively. Thus, these three measured values fall within the predefined ranges and thus are conforming. This is one example range of voltages that can be tested and is provided for purposes of explanation. Other ranges are contemplated.

Once the technician confirms the voltages are conforming to design specifications (e.g., fall within a predefined range defined in the rack design specifications), the technician can activate the switch 126 to check the neutral to ground voltage as a final system check. If all voltages are satisfactory, the technician can once again cause the HPCRS leads 106 to be de-energized. The technician can then safely handle the HPCRS leads 106 to decouple them from the connectors 124 and couple them to the connectors 112.

FIG. 2C shows the HPCRS leads 106 coupled to the computer rack 102(1) (e.g., connector 110A to connector 112A and connector 110B to connector 112B). Note connectors 112A and 112B are obscured in FIG. 2C by connectors 110A and 110B, respectively, but are shown and labelled on FIG. 2B. The HPCRS leads 106 (and hence the computer rack 102(1) and its computers 104) can now be energized with high confidence that all supplied voltages are conforming to design specifications.

Figure 3:
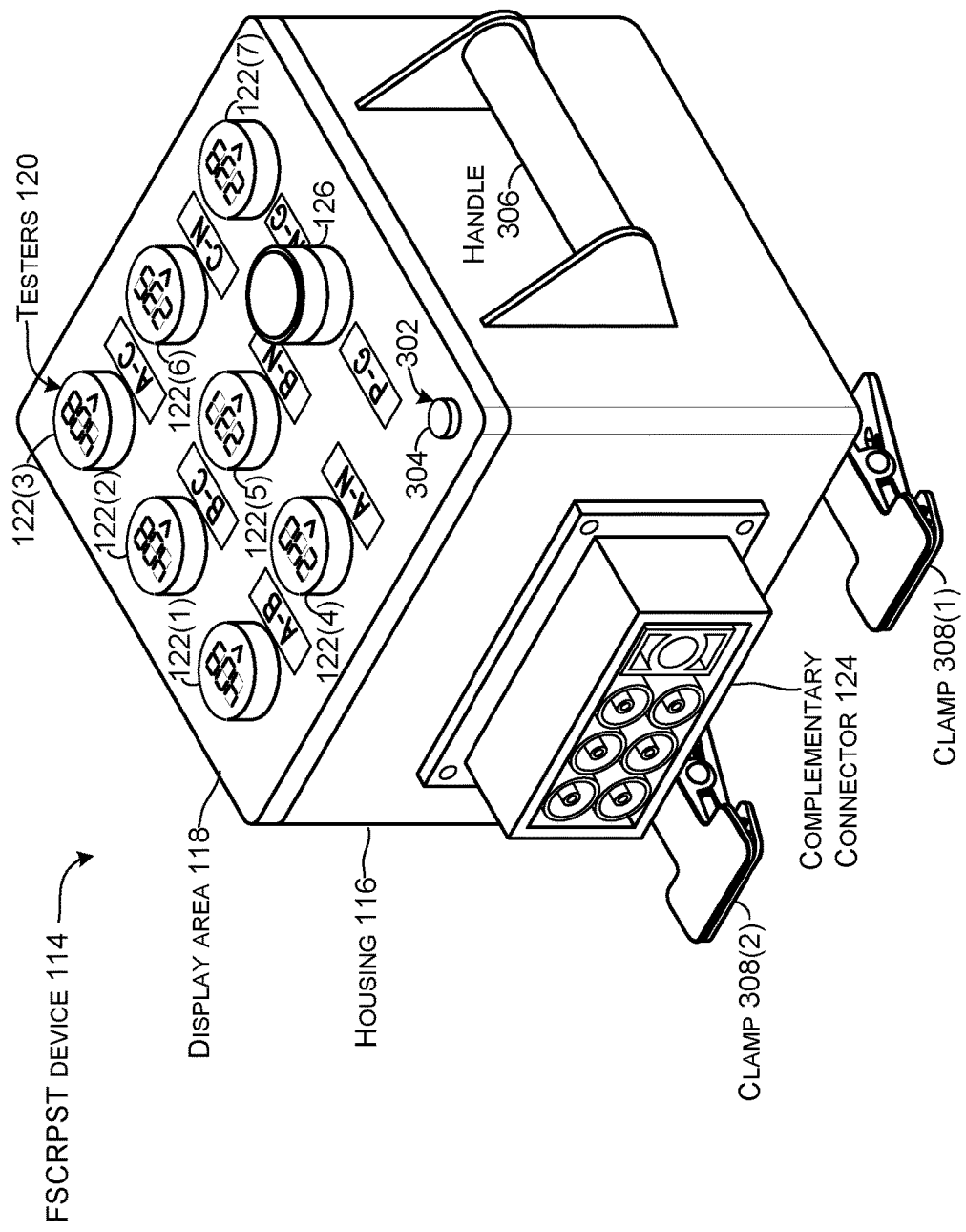

FIG. 3 shows another example FSCRPST device 114. This implementation of the FSCRPST device 114 adds a secondary or overall status indicator 302. In this case, the overall status indicator 302 is manifest as a status indicator light 304 that can provide qualitative guidance whether or not the voltage values of the voltmeters 122 conform to the design specifications. The technician can review the voltage values for the conductor pairs that are simultaneously displayed on the voltmeters and receive a secondary overall signal from the overall status indicator 302. For instance, if all of the voltages are conforming, the status indicator light 304 may emit green light and if any of the voltages are not conforming, the status indicator light 304 may emit red light, for example. In other versions, the overall status indicator 302 may provide other types of visual indications and/or audio indications, among others.

This example FSCRPST device 114 also includes a handle 306 and clamps 308. The handle allows the user to readily move and/or hold the example FSCRPST device 114 while coupling the complementary connector 124 to the HPCRS lead 106. The clamps 308 provide a mechanism that allows the technician to readily position the FSCRPST device 114 in a convenient location during testing. For instance, the clamps allow the technician to clamp the FSCRPST device 114 to the computer rack 102 during testing. This version employs multiple clamps and a single clamp is also contemplated.

FIG. 4 shows an example schematic diagram 400 for implementing FSCRPST device 114. In this case, three AC power sources are represented by F1, F2, and F3. The power sources are delivered by power conductors PA, PB, and PC, respectively. Power source F1 is electrically connected to a first side of voltmeter 122(1), a second side of voltmeter 122(3) and a first side of voltmeter 122(4). Power source F2 is electrically connected to a second side of voltmeter 122(1), a first side of voltmeter 122(2), and a first side of voltmeter 122(5). Power source F3 is electrically connected to a first input pole of single pole double throw (SPDT) switch 126, a second side of voltmeter 122(2), a first side of voltmeter 122(3), and a first side of voltmeter 122(6). Neutral line N is electrically connected to the second side of voltmeter 122(4), the second side of voltmeter 122(5), the second side of voltmeter 122(6), and a second input pole of SPDT switch 126. The output pole of SPDT switch 126 is electrically connected to an input side of voltmeter 122(7). An output side of voltmeter 122(7) is electrically connected to ground (e.g., GND1).

Figure 5:
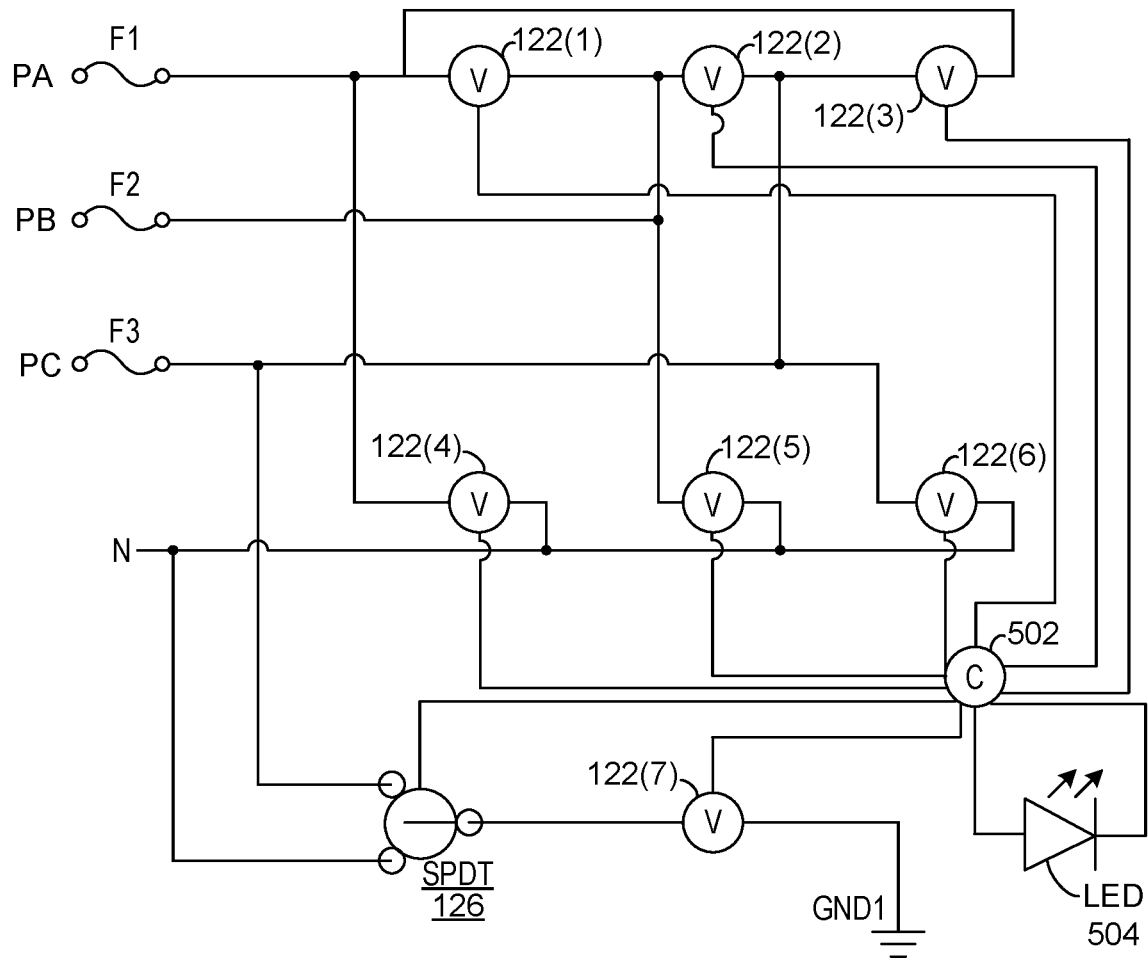

FIG. 5 shows another example schematic diagram 500 for implementing FSCRPST device 114. This example is similar to schematic diagram 400 described above, thus not all elements are re-introduced for sake of brevity. This implementation includes a compliance controller 502 and a light emitting diode (LED) 504. The compliance controller 502 is electrically connected to the voltmeters 122 and the SPDT switch 126. The compliance controller 502 can use signals from voltmeters 122 and the SPDT switch 126 as input. Connecting the compliance controller 502 to SPDT switch 126 lets the compliance controller identify whether the voltage from voltmeter 122(7) relates to power to ground or neutral to ground. The compliance controller 502 can generate an output signal that controls LED 504. For instance, the compliance controller can generate a first output signal that causes the LED 504 to emit a red color light if the voltages from the voltmeters are outside design parameters or a second output signal that causes the LED 504 to generate a green color light if the voltages from the voltmeters are within design parameters. As such, the LED 504 can function as indicator light 304 of FIG. 3.

Figure 6:
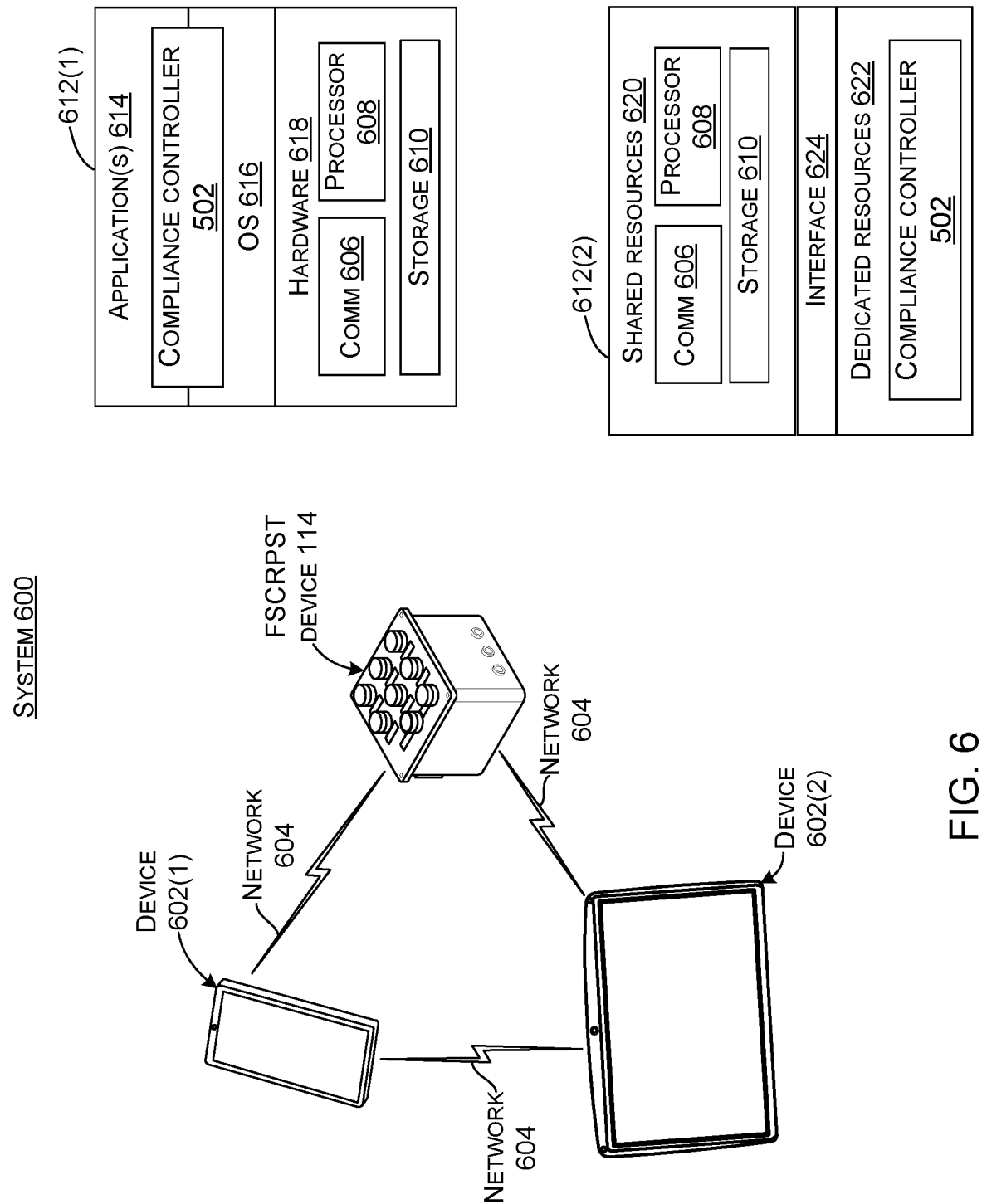

FIG. 6 shows an example system 600 that is similar to system 100 introduced relative to FIG. 1. System 600 can include computers 602 and FSCRPST device 114. Computers 602 are similar to computers 104 introduced above. In the illustrated configuration, computer 602(1) is manifest as a smartphone and computer 602(2) is manifest as a tablet type device. Computers 602 and FSCRPST device 114 can be coupled via a network 604 that is represented by lightning bolts.

Computers 602 and FSCRPST device 114 can include a communication component 606, a processor 608, storage 610, and compliance controller 502. The compliance controller can be configured to receive, store, and/or communicate information from the voltmeters 122. The compliance controller 502 can also determine if all aspects of the tested power supply are compliant with design specifications. The compliance controller 502 can generate a user interface on the FSCRPST device 114 and/or the computers 602. The user interface can display test voltages. For instance, the test voltages can be displayed by themselves or in the context of the predefined ranges. The user interface may also allow the user to set the predefined ranges for each voltage to be measured.

FIG. 6 shows two device configurations 612 that can be employed by computers 602 and/or and FSCRPST device 114. Individual devices can employ either of configurations 612(1) or 612(2), or an alternate configuration. (Due to space constraints on the drawing page, one instance of each configuration is illustrated). Briefly, device configuration 612(1) represents an operating system (OS) centric configuration. Device configuration 612(2) represents a system on a chip (SOC) configuration. Device configuration 612(1) is organized into one or more applications 614, operating system 616, and hardware 618. Device configuration 612(2) is organized into shared resources 620, dedicated resources 622, and an interface 624 therebetween.

In configuration 612(1), the compliance controller 502 can be manifest as part of the processor 608. Alternatively, the compliance controller 502 can be manifest as part of the operating system 616. Further still, the compliance controller 502 can be a freestanding component that operates cooperatively with the operating system 616 and/or the processor 608 (e.g., as a freestanding service that works cooperatively with the applications and the operating system). In configuration 612(2), the compliance controller 502 can be manifest as part of the processor 608 or as a dedicated resource 622 that operates cooperatively with the processor 608.

In some configurations, each of computers 602 and FSCRPST device 114 can have an instance of the compliance controller 502. However, the functionalities that can be performed by the compliance controller 502 may be the same or they may be different from one another when comparing computers. For instance, in some cases, each compliance controller 502 can be robust and provide all of the functionality described above and below (e.g., a device-centric implementation). In other cases, some devices can employ a less robust instance of the compliance controller 502 that relies on some functionality to be performed by another device.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs, etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 612(2) can be thought of as a system on a chip (SOC) type design. In such a case, functionality provided by the device can be integrated on a single SOC or multiple coupled SOCs. One or more processors 608 can be configured to coordinate with shared resources 620, such as storage 610, etc., and/or one or more dedicated resources 622, such as hardware blocks configured to perform certain specific functionality. Thus, the term "processor" as used relative to FIG. 6 can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 7:
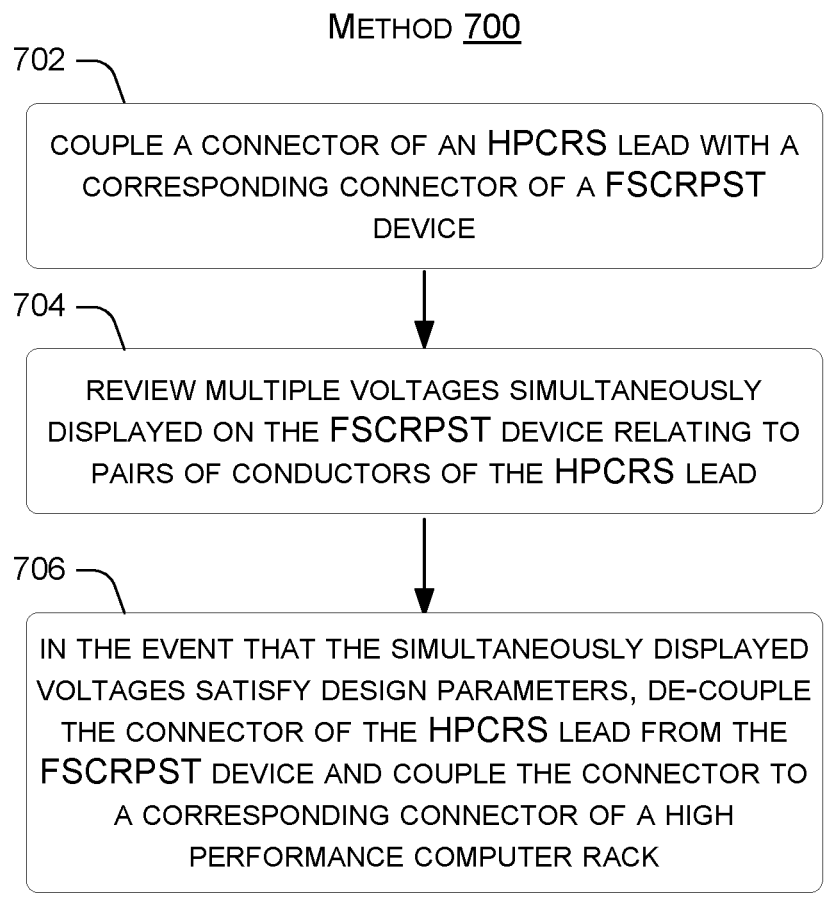
FIG. 7 shows an example flowchart for high-power computer rack power supply testing in accordance with some implementations of the present concepts.

FIG. 7 shows an example method or technique 700.

Block 702 can couple a connector of an HPCRS lead with a corresponding connector of an FSCRPST device. This aspect can be performed with the HPCRS lead de-energized.

Block 704 can review multiple voltages simultaneously displayed on the FSCRPST device relating to pairs of conductors of the HPCRS lead. This aspect can be performed after re-energizing the HPCRS lead and without touching the HPCRS lead.

Block 706 can, in the event that the simultaneously displayed voltages satisfy design parameters, de-couple the connector of the HPCRS lead from the FSCRPST device and couple the connector to a corresponding connector of a high performance computer rack. This decoupling and coupling can be performed with the HPCRS lead de-energized. The HPCRS lead can then be re-energized to power the computing devices of the high performance computer rack.

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

ADDITIONAL EXAMPLES

Various examples are described above. Additional examples are described below. One example includes a device comprising an electrically insulative housing defining a display are, a connector configured to couple to a corresponding connector of a high-power computer rack supply lead that includes multiple conductors comprising a power conductor, a neutral conductor, and a ground conductor, a set of multiple voltmeters positioned on the display area, individual voltmeters dedicated to an individual pair of conductors of the high-power computer rack supply lead and configured to display a numeric test voltage relating to the individual pair of conductors simultaneously to other voltmeters of the set displaying numeric test voltages relating to other pairs of individual conductors, and a single pole double throw switch positioned on the display area and having an output pole electrically coupled to the ground conductor through an individual voltmeter and having a first input pole electrically coupled to the power conductor and a second input pole electrically coupled to the neutral conductor, the single pole double throw switch biased to a first closed position on the first input pole to display test voltages between the power conductor and the ground conductor on the individual voltmeter and configured to display test voltages between the neutral conductor and the ground conductor on the individual voltmeter in a second closed position.

Another example can include any of the above and/or below examples where the display area is a single surface, and wherein the single surface is planar or curvilinear.

Another example can include any of the above and/or below examples where the device includes a handle or a clamp.

Another example can include any of the above and/or below examples where the power conductor comprises a first power conductor, a second power conductor, and a third power conductor.

Another example can include any of the above and/or below examples where the set of multiple voltmeters comprises seven voltmeters.

Another example can include any of the above and/or below examples where the pairs of conductors comprise the first power conductor and the second power conductor, the first power conductor and the third power conductor, the second power conductor and the third power conductor, the first power conductor and the neutral conductor, the second power conductor and the neutral conductor, and the third power conductor and the neutral conductor.

Another example can include any of the above and/or below examples where the connector is a Harting connector.

Another example can include any of the above and/or below examples where the connector is a national electrical manufacturers association (NEMA) connector.

Another example can include any of the above and/or below examples where the device further comprises a status indicator configured to indicate whether all of the simultaneously displayed numeric test voltages conform to design specifications.

Another example can include any of the above and/or below examples where the status indicator comprises an indicator light that emits a first color light if all of the simultaneously displayed numeric test voltages satisfy the design specifications and a second color of light if any of the simultaneously displayed numeric test voltages fail to satisfy the design specifications.

Another example includes a system comprising a computer rack comprising multiple computers, a high-power computer rack supply (HPCRS) lead terminating in a connector configured to couple to the computer rack to power the multiple computers and comprising three power conductors, a neutral conductor, and a ground conductor, and a full-spectrum computer rack power supply testing (FSCRPST) device configured to test voltages from the HPCRS lead and comprising an electrically insulative housing, a corresponding connector positioned on the housing and configured to couple to the connector of the high-power computer rack supply lead, a set of multiple alternating current (AC) voltmeters positioned on the housing, individual AC voltmeters dedicated to an individual pair of conductors of the high-power computer rack supply lead and configured to display a numeric test voltage relating to the individual pair of conductors simultaneously to other AC voltmeters of the set displaying numeric test voltages relating to other pairs of individual conductors, and a switch electrically coupled to an individual AC voltmeter and electrically coupled to the one of the power conductors at a first input pole and electrically coupled to the neutral conductor at a second input pole and to the ground conductor through the individual AC voltmeter at an output pole, the switch configured to be in a first closed position on the first input pole to display test voltages between the power conductor and the ground conductor on the individual voltmeter and configured to display test voltages between the neutral conductor and the ground conductor on the individual voltmeter in a second closed position on the second input pole.

Another example can include any of the above and/or below examples where the switch is biased to the first closed position.

Another example can include any of the above and/or below examples where the switch comprises a single pole double throw switch.

Another example can include any of the above and/or below examples where the three power conductors are configured to deliver three phase AC power to the computer rack.

Another example can include any of the above and/or below examples where the FSCRPST device further includes an overall status indicator that is configured to indicate whether all of the simultaneously displayed numeric test voltages are within predefined ranges.

Another example includes a device comprising an electrically insulative housing defining a display area, a connector positioned on the housing and configured to couple to a corresponding connector of a high-power computer rack supply lead that includes multiple conductors comprising first second and third power conductors, a neutral conductor, and a ground conductor, seven voltmeters positioned on the display area, individual voltmeters dedicated to individual pairs of conductors of the high-power computer rack supply lead and configured to display a numeric test voltage relating to the individual pair of conductors simultaneously to other voltmeters displaying numeric test voltages relating to other pairs of individual conductors, and a single pole double throw switch positioned on the display area and electrically coupled at an output pole to the ground conductor through another individual voltmeter and electrically coupled to the power conductor at a first input pole and electrically coupled to the neutral conductor at a second input pole, the single pole double throw switch comprising a first closed position on the first input pole to display test voltages between the power conductor and the ground conductor on the individual voltmeter and configured to display test voltages between the neutral conductor and the ground conductor on the individual voltmeter in a second closed position.

Another example can include any of the above and/or below examples where a first voltmeter is electrically connected to the first power conductor and the second power conductor, a second voltmeter is electrically connected to the first power conductor and the third power conductor, a third voltmeter is electrically connected to the second power conductor and the third power conductor, a fourth voltmeter is electrically connected to the first power conductor and the neutral conductor, a fifth voltmeter is electrically connected to the second power conductor and the neutral conductor, and a sixth voltmeter is electrically connected to the third power conductor and the neutral conductor.

Another example can include any of the above and/or below examples where the another individual voltmeter comprises a seventh voltmeter that is electrically connected to the single pole double throw switch.

Another example can include any of the above and/or below examples where the device further comprises a compliance controller that is electrically connected to the seven voltmeters and the single pole double throw switch.

Another example can include any of the above and/or below examples where the compliance controller is configured to cause an indication to be generated that conveys whether voltages on the seven voltmeters conform with design specifications.

CONCLUSION

Although the subject matter relating to safe and effective high-power computer rack power supply testing has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device, comprising:
an electrically insulative housing defining a display area;
a connector configured to couple to a corresponding connector of a high-power computer rack supply lead that includes multiple conductors comprising a power conductor, a neutral conductor, and a ground conductor;
a set of multiple voltmeters positioned on the display area, individual voltmeters dedicated to an individual pair of conductors of the high-power computer rack supply lead and configured to display a numeric test voltage relating to the individual pair of conductors simultaneously to other voltmeters of the set displaying numeric test voltages relating to other pairs of individual conductors; and,
a single pole double throw switch positioned on the display area and having an output pole electrically coupled to the ground conductor through an individual voltmeter and having a first input pole electrically coupled to the power conductor and a second input pole electrically coupled to the neutral conductor, the single pole double throw switch biased to a first closed position on the first input pole to display test voltages between the power conductor and the ground conductor on the individual voltmeter and configured to display test voltages between the neutral conductor and the ground conductor on the individual voltmeter in a second closed position.

2. The device of claim 1, wherein the display area is a single surface, and wherein the single surface is planar or curvilinear.

3. The device of claim 2, wherein the device includes a handle or a clamp.

4. The device of claim 3, wherein the power conductor comprises a first power conductor, a second power conductor, and a third power conductor.

5. The device of claim 4, wherein the set of multiple voltmeters comprises seven voltmeters.

6. The device of claim 5, wherein the pairs of conductors comprise the first power conductor and the second power conductor, the first power conductor and the third power conductor, the second power conductor and the third power conductor, the first power conductor and the neutral conductor, the second power conductor and the neutral conductor, and the third power conductor and the neutral conductor.

7. The device of claim 6, wherein the connector is a Harting connector.

8. The device of claim 6, wherein the connector is a national electrical manufacturers association (NEMA) connector.

9. The device of claim 6, further comprising a status indicator configured to indicate whether all of the simultaneously displayed numeric test voltages conform to design specifications.

10. The device of claim 9, wherein the status indicator comprises an indicator light that emits a first color light if all of the simultaneously displayed numeric test voltages satisfy the design specifications and a second color of light if any of the simultaneously displayed numeric test voltages fail to satisfy the design specifications.

11. A system, comprising:
a computer rack configured to hold multiple computers;
a high-power computer rack supply (HPCRS) lead terminating in a connector configured to couple to the computer rack to power the multiple computers and comprising three power conductors, a neutral conductor, and a ground conductor; and
a full-spectrum computer rack power supply testing (FSCRPST) device configured to test voltages from the HPCRS lead and comprising:
an electrically insulative housing;
a corresponding connector positioned on the housing and configured to couple to the connector of the high-power computer rack supply lead;
a set of multiple alternating current (AC) voltmeters positioned on the housing, individual AC voltmeters dedicated to an individual pair of conductors of the high-power computer rack supply lead and configured to display a numeric test voltage relating to the individual pair of conductors simultaneously to other AC voltmeters of the set displaying numeric test voltages relating to other pairs of individual conductors; and,
a switch electrically coupled to an individual AC voltmeter and electrically coupled to the one of the power conductors at a first input pole and electrically coupled to the neutral conductor at a second input pole and to the ground conductor through the individual AC voltmeter at an output pole, the switch configured to be in a first closed position on the first input pole to display test voltages between the power conductor and the ground conductor on the individual voltmeter and configured to display test voltages between the neutral conductor and the ground conductor on the individual voltmeter in a second closed position on the second input pole.

12. The system of claim 11, wherein the switch is biased to the first closed position.

13. The system of claim 12, wherein the switch comprises a single pole double throw switch.

14. The system of claim 13, wherein the three power conductors are configured to deliver three phase AC power to the computer rack.

15. The system of claim 14, wherein the FSCRPST device further includes an overall status indicator that is configured to indicate whether all of the simultaneously displayed numeric test voltages are within predefined ranges.

16. A device, comprising:
an electrically insulative housing defining a display area;
a connector positioned on the housing and configured to couple to a corresponding connector of a high-power computer rack supply lead that includes multiple conductors comprising first second and third power conductors, a neutral conductor, and a ground conductor;
seven voltmeters positioned on the display area, individual voltmeters dedicated to individual pairs of conductors of the high-power computer rack supply lead and configured to display a numeric test voltage relating to the individual pair of conductors simultaneously to other voltmeters displaying numeric test voltages relating to other pairs of individual conductors; and,
a single pole double throw switch electrically coupled at an output pole to the ground conductor through another individual voltmeter and electrically coupled to the power conductor at a first input pole and electrically coupled to the neutral conductor at a second input pole, the single pole double throw switch comprising a first closed position on the first input pole to display test voltages between the power conductor and the ground conductor on the individual voltmeter and configured to display test voltages between the neutral conductor and the ground conductor on the individual voltmeter in a second closed position.

17. The device of claim 16, wherein a first voltmeter is electrically connected to the first power conductor and the second power conductor, a second voltmeter is electrically connected to the first power conductor and the third power conductor, a third voltmeter is electrically connected to the second power conductor and the third power conductor, a fourth voltmeter is electrically connected to the first power conductor and the neutral conductor, a fifth voltmeter is electrically connected to the second power conductor and the neutral conductor, and a sixth voltmeter is electrically connected to the third power conductor and the neutral conductor.

18. The device of claim 17, wherein the another individual voltmeter comprises a seventh voltmeter that is electrically connected to the single pole double throw switch.

19. The device of claim 18, further comprising a compliance controller that is electrically connected to the seven voltmeters and the single pole double throw switch.

20. The device of claim 19, wherein the compliance controller is configured to cause an indication to be generated that conveys whether voltages on the seven voltmeters conform with design specifications.

* * * * *